United States Patent
Gotou et al.

(10) Patent No.: US 12,032,353 B2
(45) Date of Patent: Jul. 9, 2024

(54) EXAMINING APPARATUS, EXAMINING METHOD AND RECORDING MEDIUM

(71) Applicant: Yokogawa Electric Corporation, Tokyo (JP)

(72) Inventors: Hirotsugu Gotou, Tokyo (JP); Kazutoshi Kodama, Tokyo (JP); Go Takami, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 1220 days.

(21) Appl. No.: 16/190,170

(22) Filed: Nov. 14, 2018

(65) Prior Publication Data
US 2019/0163165 A1    May 30, 2019

(30) Foreign Application Priority Data

Nov. 28, 2017    (JP) .................................. 2017-228244

(51) Int. Cl.
*G05B 19/4063*    (2006.01)
*G05B 13/02*    (2006.01)
(Continued)

(52) U.S. Cl.
CPC ..... *G05B 19/4063* (2013.01); *G05B 13/0265* (2013.01); *G05B 23/0254* (2013.01); *G06N 20/20* (2019.01); *G05B 2219/33034* (2013.01)

(58) Field of Classification Search
None
See application file for complete search history.

(56) References Cited

U.S. PATENT DOCUMENTS

2006/0142990 A1    6/2006   Vatchkov
2010/0070130 A1    3/2010   Suzuki
(Continued)

FOREIGN PATENT DOCUMENTS

EP    1609033 A1    12/2005
JP    H08202444 A    8/1996
(Continued)

OTHER PUBLICATIONS

Busemeyer et al. Model Comparisons and Model Selections Based on Generalization Criterion Methodology, Journal of Mathematical Psychology vol. 44, Issue 1, Mar. 2000, pp. 171-189, https://doi.org/10.1006/jmps.1999.1282. (Year: 2000).*

(Continued)

*Primary Examiner* — Kenneth M Lo
*Assistant Examiner* — Istiaque Ahmed

(57) ABSTRACT

To easily perform examination of at least one facility based on detection signals of a plurality of sensors installed in the facility. Provided are an examining apparatus, an examining method and a recording medium, including: a group designation acquiring unit to acquire designation of a targeted group including a plurality of targeted sensors to be analyzed among a plurality of sensors installed in at least one facility; a sensor data acquiring unit to acquire sensor data from each targeted sensor included in the targeted group; a learning unit to learn an analysis model by using the sensor data from each targeted sensor included in the targeted group; and an examining unit to examine the facility by using the learned analysis model.

12 Claims, 7 Drawing Sheets

(51) Int. Cl.
  *G05B 23/02* (2006.01)
  *G06N 20/20* (2019.01)

(56) References Cited

U.S. PATENT DOCUMENTS

| | | | |
|---|---|---|---|
| 2012/0035802 A1 | 2/2012 | Suzuki | |
| 2012/0041575 A1 | 2/2012 | Maeda | |
| 2013/0173218 A1 | 7/2013 | Maeda | |
| 2013/0282336 A1 | 10/2013 | Maeda | |
| 2015/0169393 A1* | 6/2015 | Shibuya | G05B 23/0243 |
| | | | 702/182 |
| 2017/0184680 A1* | 6/2017 | You | G01R 31/3842 |
| 2018/0060752 A1* | 3/2018 | Gross | G06F 11/3409 |
| 2018/0120813 A1* | 5/2018 | Coffman | B33Y 50/00 |
| 2018/0306609 A1* | 10/2018 | Agarwal | H04L 67/12 |
| 2019/0266039 A1* | 8/2019 | Ochiai | G05B 23/02 |

FOREIGN PATENT DOCUMENTS

| | | | |
|---|---|---|---|
| JP | 2000181526 A | 6/2000 | |
| JP | 2012058890 A | 3/2012 | |
| JP | 2014056598 A | 3/2014 | |
| JP | 2015035118 A | 2/2015 | |
| JP | 2015203936 A | 11/2015 | |
| JP | 2017045215 A | 3/2017 | |
| WO | 2010095314 A1 | 8/2010 | |

OTHER PUBLICATIONS

Office Action issued for counterpart Japanese Application No. 2017-228244, issued by the Japanese Patent Office dated Jan. 4, 2022 (drafted on Dec. 21, 2021).

Office Action issued for counterpart European Application 18206624.1, issued by the European Patent Office dated Nov. 26, 2021.

Partial European Search Report issued for counterpart European Application No. 18206624.1, issued by the European Patent Office dated Apr. 12, 2019.

Greetika Sharma et al., "Multi-Sensor Visual Analytics supported by Machine-learning Models", IEEE 15th International Conference on Data Mining Workshops, 2015, pp. 668-674, IEEE Computer Society.

Office Action issued for counterpart Japanese Application No. 2017-228244, issued by the Japanese Patent Office dated Jul. 6, 2021 (drafted on Jun. 30, 2021).

Go Takami et al., "Machine Learning Applied to Sensor Data Analysis", Yokogawa Technical Report English Edition, vol. 59, No. 1(2016), p. 27-30.

Hiroaki Kanokogi et al., "Machine Learning Applied to Sensor Data Analysis:Part 2", Yokogawa Technical Report English Edition, vol. 60, No. 1(2017), p. 35-38.

Office Action issued for counterpart Chinese Application 201811358989.8, issued by The State Intellectual Property Office of People's Republic of China dated Jan. 6, 2023.

* cited by examiner

EXAMINING APPARATUS, EXAMINING METHOD AND RECORDING MEDIUM

The contents of the following Japanese patent application(s) are incorporated herein by reference:
 NO. 2017-228244 filed on Nov. 28, 2017.

BACKGROUND

1. Technical Field

The present invention relates to an examining apparatus, an examining method and a recording medium.

2. Related Art

Conventionally, the examination of abnormalities in the facilities of a plant or the like has been performed based on the detection signals of a plurality of sensors installed in the facilities, so as to stably operate the plant or the like. Further, consideration has been made regarding the possibility of using machine learning for analyzing the detection signals of these plurality of sensors (see Non-Patent Documents 1 and 2, for example).
 Non-Patent Document 1: Go Takami, Moe Tokuoka, Hirotsugu Goto, and Yuuichi Nozaka, "Machine Learning Applied to Sensor Data Analysis", Yokogawa Technical Report, Vol. 59, No. 1, p. 27-30
 Non-Patent Document 2: Hiroaki Kanokogi, Go Takami, "Machine Learning Applied to Sensor Data Analysis: Part 2", Yokogawa Technical Report, Vol. 60, No. 1, p. 35-38

SUMMARY

However, since the scale of the facilities of a plant or the like is large and a large number and many types of sensors are provided therein, even when the detection signals of individual sensors exceed their thresholds, it has been difficult to immediately determine that there is an abnormality in the facilities. In other cases, abnormalities in these facilities may be seen even though the detection signals of individual sensors do not exceed their thresholds. Accordingly, the determination of abnormalities in these facilities has been made by knowledged and experienced operators by monitoring the correlations between the detection signals of a plurality of sensors or the like.

A first aspect of the present invention provides an examining apparatus, an examining method and a recording medium, including: a group designation acquiring unit to acquire designation of a targeted group including a plurality of targeted sensors to be analyzed among a plurality of sensors installed in at least one facility; a sensor data acquiring unit to acquire sensor data from each targeted sensor included in the targeted group; a learning unit to learn an analysis model by using the sensor data from each targeted sensor included in the targeted group; and an examining unit to examine the facility by using the learned analysis model.

A second aspect of the present invention provides an examining apparatus including: a sensor data acquiring unit to acquire sensor data from each targeted sensor included in a plurality of targeted sensors to be analyzed among a plurality of sensors installed in at least one facility; a learning unit to learn an analysis model by using the sensor data from each targeted sensor; an examining unit to examine the facility by using the learned analysis model; and a user interface unit to input feedback on an examination result obtained by using the analysis model, wherein the learning unit learns the analysis model by further using the feedback.

The summary clause does not necessarily describe all necessary features of the embodiments of the present invention. The present invention may also be a sub-combination of the features described above.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
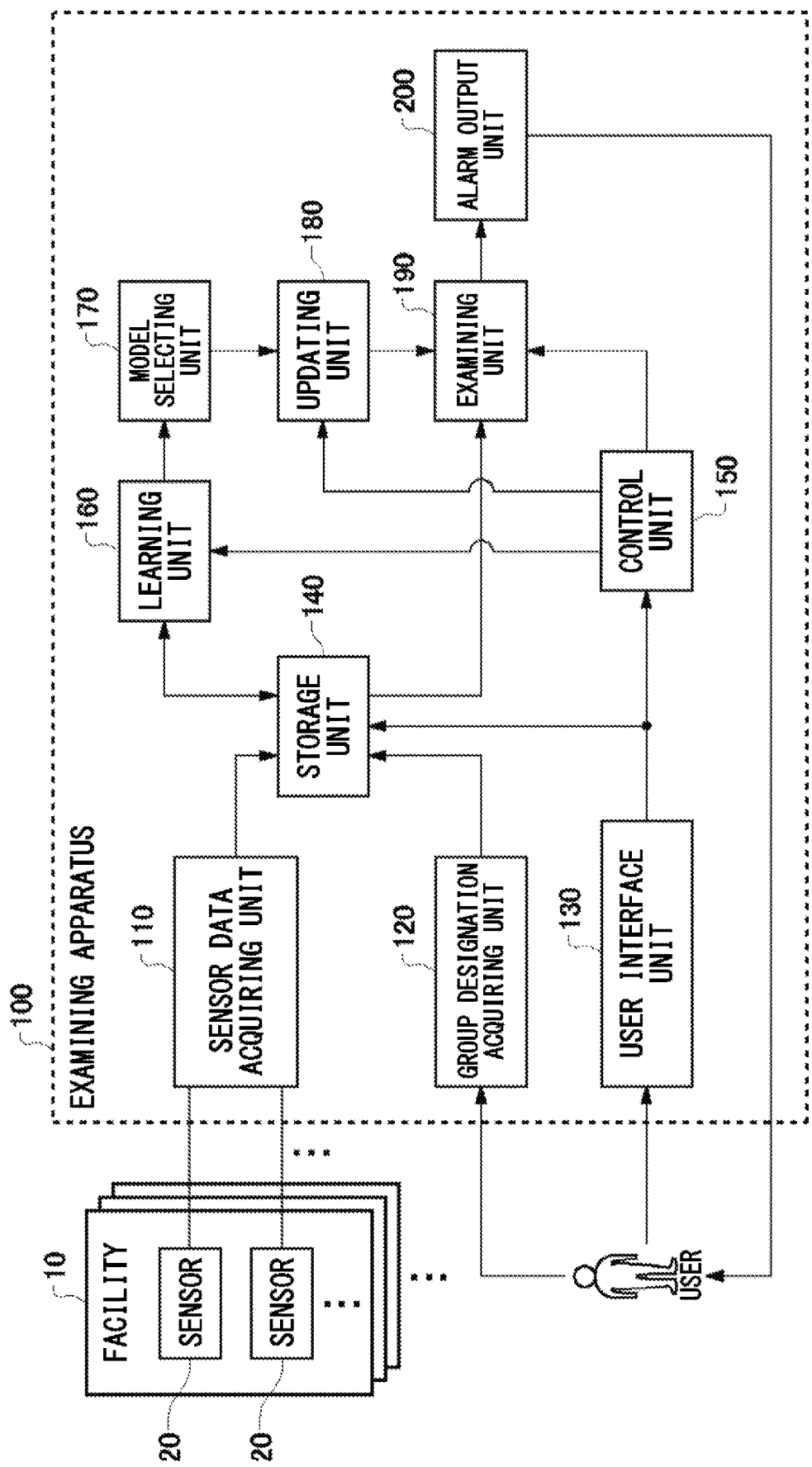
FIG. 1 shows an example configuration of an examining apparatus 100 according to the present embodiment, together with facilities 10.

FIG. 1 shows an example configuration of an examining apparatus 100 according to the present embodiment, together with a plurality of facilities 10. The plurality of facilities 10 are at least part of a plant such as a factory, a mechanical plant, a production plant, a power-generating plant, a storage plant or the like, for example. The plurality of facilities 10 may be control targets in the plant. Each of the facilities 10 is at least part of a factory facility, a mechanical apparatus, a production apparatus, a power-generating apparatus, a storage apparatus or the like, for example. The facilities 10 may include one or more apparatuses. The facilities 10 may also include equipment and the like. The examining apparatus 100 appropriately performs controls including operational abnormality detection, management, maintenance and the like for at least one of the facilities 10, to stably operate the plant. Note that the examining apparatus 100 can be applied to a facility such as an air conditioner or lighting fixture in a building, for example, besides the plant.

A plurality of sensors 20 are installed in each of the plurality of facilities 10. Each of the plurality of sensors 20 detects a state of the facility 10 in which it is installed, and outputs a detection result. The plurality of sensors 20 detect various states of the facilities 10. For example, the plurality of sensors 20 are pressure sensors, pH sensors, vibration sensors, temperature sensors, flow rate sensors, corrosion sensors, strain sensors, noise sensors, gas sensors, or the like.

Attempts have been made to detect abnormal operations of the plurality of facilities 10 by setting respective thresholds to the plurality of sensors 20 and generating an alarm when a threshold is exceeded. However, in the facilities 10 of the actual plant, it can hardly be determined that an abnormal operation occurs only due to the generation of an alarm by one sensor 20, and therefore the determination of abnormal operations has been made based on the correlations between the detection results of a plurality of sensors 20.

For example, even when the detection signals of respective sensors 20 exceed their thresholds, it has been difficult to immediately determine that there is an abnormality in the facilities 10. This is because, for example, if the detection signals of some sensors 20 indicate abnormality but the detection signals of the other sensors 20 indicate normality, the facilities 10 can operate normally in some cases. In other cases, abnormalities in the facilities 10 may occur even though the detection signals of a plurality of sensors 20 do not exceed their thresholds. This is because, for example, abnormalities in the facilities 10 may occur due to fatigue when the detection signals of a plurality of sensors 20 are close to their thresholds. Thus, the determination of the presence or absence of abnormalities in the facilities 10 has been made by knowledged and experienced operators by monitoring the correlations between the detection signals of a plurality of sensors or the like.

As a result, the accuracy of abnormality detection in the facilities 10 depends on the operators, and therefore it has not been easy to improve the accuracy. Also, since there is a limited number of knowledged and experienced operators, there may be a limited number of facilities 10 that can be accurately controlled. Also, in the case of setting respective thresholds to the plurality of sensors 20, time for trial and error or the like may be required due to the difficulty in setting appropriate thresholds. Also, if an abnormality occurs in the facilities 10 in spite of the fact that the detection signals of a plurality of sensors 20 do not exceed their thresholds, even skilled operators sometimes fail to detect the abnormal state.

Further, management and maintenance are also important for controlling the facilities 10 in a plant, and it is desirable that abnormal operations in the facilities 10 can be predicted to some extent. However, since it is difficult to detect past or current abnormal operations merely by setting thresholds to the plurality of sensors 20 as described above, it is even difficult to predict future abnormal operations.

Thus, the examining apparatus 100 according to the present embodiment generates an analysis model for examining abnormal operations of the facilities 10 based on the detection signals of a plurality of sensors 20, and applies learning to the analysis model to improve examination accuracy. The examining apparatus 100 includes a sensor data acquiring unit 110, a group designation acquiring unit 120, a user interface unit 130, a storage unit 140, a control unit 150, a learning unit 160, a model selecting unit 170, an updating unit 180, an examining unit 190 and an alarm output unit 200.

The sensor data acquiring unit 110 acquires sensor data of the plurality of sensors 20. For example, the sensor data acquiring unit 110 acquires, as the sensor data, detection results of the plurality of sensors 20, which are provided in the facilities 10 to be examined. The sensor data acquiring unit 110 may acquire sensor data from each of the plurality of sensors 20. The sensor data acquiring unit 110 may also acquire sensor data temporarily accumulated in a buffer, database or the like. The sensor data acquiring unit 110 may supply the acquired sensor data to the storage unit 140.

The group designation acquiring unit 120 acquires the designation of a targeted group including a plurality of targeted sensors to be analyzed among the plurality of sensors 20 installed in the facilities 10. The plurality of targeted sensors to be analyzed may be a plurality of sensors 20 provided in the facilities 10 to be examined. The targeted sensors may also include sensors 20 that, although not provided in the facilities 10, output sensor data correlated with the operational state of the facilities 10 to be examined. The targeted sensors may not include sensors 20 that, although provided in the facilities 10, output sensor data not correlated at all with the operational state of the facilities 10 to be examined. A targeted group including these targeted sensors may be designated for each of the facilities 10 to be examined.

For example, a targeted group to be analyzed may be designated for each of a plurality of facilities such as boilers, motors and the like. In this case, the plurality of sensors installed in each of the plurality of facilities may be included in their corresponding targeted group. A targeted group to be analyzed may also be designated for each system such as an electrical system or mechanical system in one facility such as a motor or the like. In this case, the plurality of sensors for detecting the state of each system may be included in their corresponding targeted group.

The examining apparatus 100 examines, based on the sensor data of the targeted sensors included in the targeted group corresponding to a facility 10 acquired by the group designation acquiring unit 120, the operational state of the facility 10. If there are a plurality of facilities 10 to be examined, the group designation acquiring unit 120 acquires the designation of a plurality of targeted groups. The group designation acquiring unit 120 may acquire the designation of the targeted group according to an input by the user of the examining apparatus 100. If information of the targeted group is stored in a database or the like, the group designation acquiring unit 120 may access the database or the like to acquire the designation of the targeted group. The group designation acquiring unit 120 may supply the acquired information of the targeted group to the storage unit 140.

The user interface unit 130 receives the input of feedback on an examination result of the examining apparatus 100. For example, the user interface unit 130 may receive, from the user, information of whether the examination result is correct. The user interface unit 130 may receive the feedback by means of wired or wireless communication with a device such as a terminal or mobile terminal used by the user. Note that the user includes an owner or administrator of the facilities 10, an administrator or operator in charge of the maintenance of the facilities 10, or the like.

Note that, if the user inputs the designation of the targeted group, the group designation acquiring unit 120 may receive the information of the targeted group via the user interface unit 130. The user interface unit 130 may also receive inputs from the user such as a variety of setting information of the examining apparatus 100, learning data, instructions to start and stop operations, and the like. The user interface unit 130 may supply the input information to the storage unit 140. The user interface unit 130 may also supply the input operational instructions for the examining apparatus 100 and the like to the control unit 150.

The storage unit 140 stores the sensor data, the information of the targeted group and the input data from the user.

The storage unit 140 may also store learning data. For example, the storage unit 140 stores learning data input to the user interface unit 130. The storage unit 140 may also store labeled data obtained based on feedback by the user. The storage unit 140 may function as a database of these various types of data.

The storage unit 140 may also be capable of storing data to be processed by the examining apparatus 100. The storage unit 140 may store each of learning data, learning models, transient data, calculation results, parameters and the like that are calculated (or utilized) by the examining apparatus 100 in the process of generating an examination result. In response to a request from each unit of the examining apparatus 100, the storage unit 140 may supply the stored data to the request source.

The control unit 150 controls learning operations and examining operations of the examining apparatus 100. The control unit 150 may cause the examining apparatus 100 to perform at least one of a learning operation and examining operation according to an instruction by the user.

The learning unit 160 learns analysis models by using the sensor data from each targeted sensor included in the targeted group. For example, the learning unit 160 learns a plurality of types of analysis models by using the sensor data from each targeted sensor included in the targeted group. The learning unit 160 may learn at least some analysis models by means of supervised learning.

In this case, the learning unit 160 may learn analysis models by further using feedback input to the user interface unit 130. That is, the learning unit 160 may learn analysis models by using labeled data obtained based on feedback stored in the storage unit. Note that the learning unit 160 may generate labeled data based on feedback of the examining apparatus 100. The learning unit 160 may store the generated labeled data in the storage unit 140. The learning unit 160 may learn analysis models according to an instruction from the control unit 150.

The model selecting unit 170 selects an analysis model to be used for examining the facilities 10 from among the plurality of types of analysis models learned by the learning unit 160. For example, the model selecting unit 170 evaluates each of the plurality of types of analysis models to select an analysis model for examination based on evaluation results. The model selecting unit 170 may select one or more analysis models for examination. The model selecting unit 170 may supply the selected analysis model to the updating unit 180.

The updating unit 180 compares the analysis model being used by the examining apparatus 100 and the analysis model selected by the model selecting unit 170, and updates the analysis model to be used by the examining unit 190 based on the comparison result. Note that the analysis model being used by the examining apparatus 100 may be an analysis model previously selected by the model selecting unit 170. For example, the updating unit 180 updates the analysis model when the evaluation result of the analysis model selected by the model selecting unit 170 is higher than the evaluation result of the analysis model being used by the examining apparatus 100. The updating unit 180 may update the analysis model according to an instruction from the control unit 150.

The examining unit 190 examines the facilities 10 by using the learned analysis model. The examining unit 190 may perform examination for each of the facilities 10 respectively corresponding to a plurality of targeted groups. The examining unit 190 may examine the facilities 10 by using one or more learned analysis models. For example, the examining unit 190 examines whether an abnormality occurs in the operation of the facilities 10 and the user should be notified of an alarm. The examining unit 190 may examine the facilities 10 according to an instruction from the control unit 150. The examining unit 190 may supply the examination result to the alarm output unit 200. The examining unit 190 may also store the examination result as a history in the storage unit 140.

The alarm output unit 200 outputs an alarm when the examination result obtained by using the analysis model indicates an abnormality in the facilities 10. The alarm output unit 200 may output the alarm to the user. For example, the alarm output unit 200 outputs the alarm to a device such as a terminal, mobile terminal or the like of the user. Note that the alarm output unit 200 may also output the alarm via the user interface unit 130.

As described above, the examining apparatus 100 examines the facilities 10 by using a learned analysis model. Also, the examining apparatus 100 learns analysis models based on feedback by the user on examination results of the examining apparatus 100. The following describes the operations of the examining apparatus 100.

Figure 2:
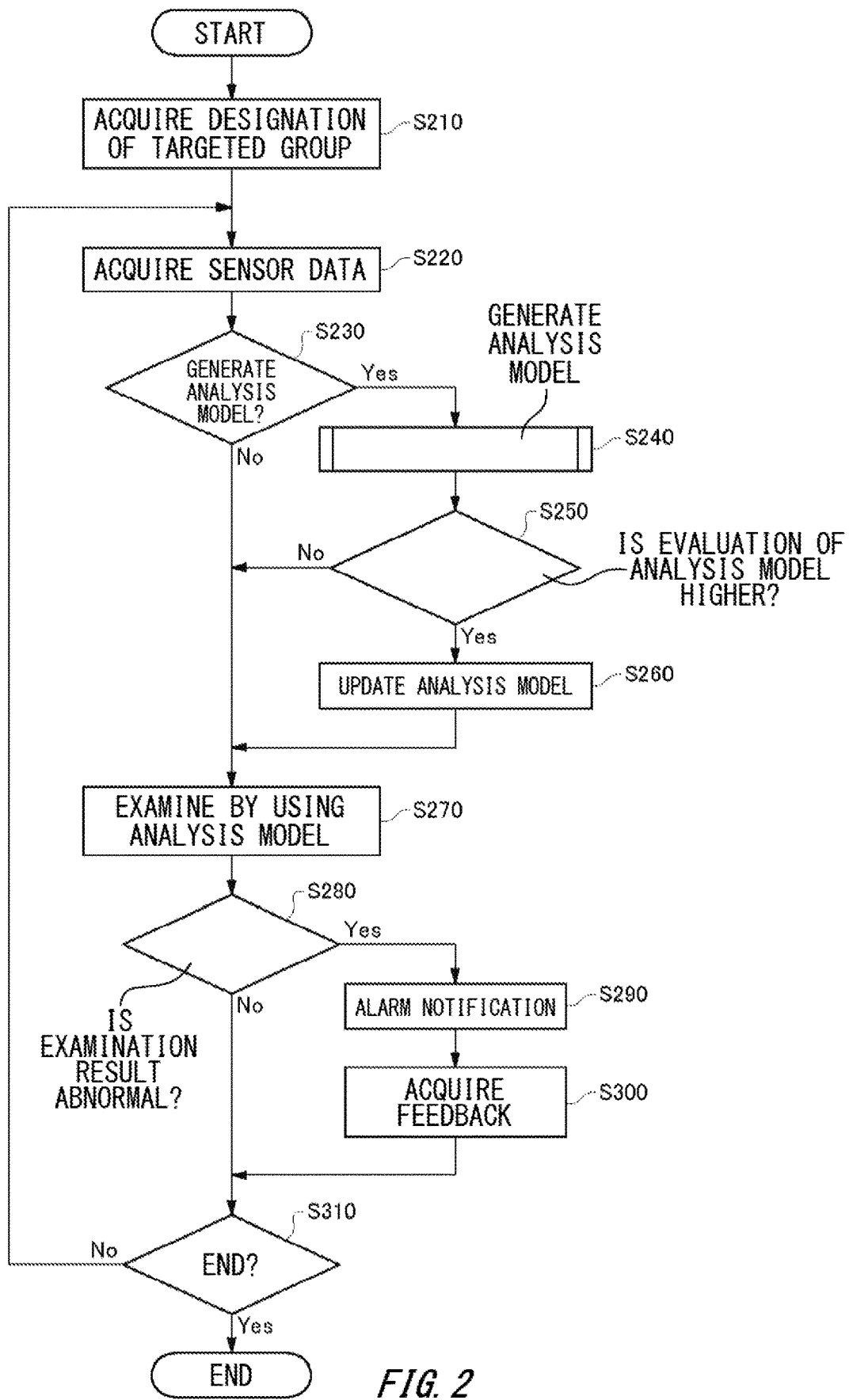
FIG. 2 shows an example of the operation flow of the examining apparatus 100 according to the present embodiment.

FIG. 2 shows an example of the operation flow of the examining apparatus 100 according to the present embodiment. The examining apparatus 100 performs the operation flow shown in FIG. 2 to examine the facilities 10 while learning analysis models.

The group designation acquiring unit 120 acquires the designation of a targeted group (S210). The group designation acquiring unit 120 may also acquire the designation of a plurality of targeted groups to examine a plurality of facilities 10. Also, the initial setting of each unit of the examining apparatus 100 may be performed. For example, the user interface unit 130 receives, from the user, the designation or input of learning data to be used and data to be used for learning analysis models or the like. The user interface unit 130 may also receive the input of the notification destination of an alarm output by the alarm output unit 200.

Next, the sensor data acquiring unit 110 acquires sensor data from each targeted sensor included in the targeted group (S220). Note that, if the group designation acquiring unit 120 acquires the designation of a plurality of targeted groups, the sensor data acquiring unit 110 may acquire sensor data from each targeted sensor included in each of the plurality of targeted groups.

For example, the sensor data acquiring unit 110 acquires sensor data from a plurality of sensors 20 including targeted sensors, and stores the acquired sensor data in the storage unit 140. The learning unit 160 and the examining unit 190 may process the sensor data from each targeted sensor according to information of the targeted group and the sensor data stored in the storage unit 140. Alternatively, the sensor data acquiring unit 110 may acquire sensor data from each of the targeted sensors included in the targeted group based on information of the targeted group, and store the sensor data in the storage unit 140 as sensor data from each targeted sensor.

Next, the control unit 150 determines whether to generate an analysis model (S230). For example, if the examination of the facilities 10 is to be performed while performing an analysis model learning operation, the control unit 150 generates an analysis model. If a timing for generating an analysis model is preset, the control unit 150 may generate the analysis model upon reaching the generation timing.

Thus, if an analysis model is to be generated (S230: Yes), the control unit 150 causes the learning unit 160 to generate the analysis model (S240).

Note that, if the group designation acquiring unit 120 acquires the designation of a plurality of targeted groups, the learning unit 160 may use sensor data from each targeted sensor included in each of the plurality of targeted groups to learn and generate analysis models respectively associated with the plurality of targeted groups. That is, the learning unit 160 may generate one or more analysis models. The generation of analysis models by the learning unit 160 will be described later. Note that, if an analysis model is not to be generated (S230: No), the control unit 150 may advance the process to the examination of the facilities 10 (S270).

Next, the control unit 150 causes the updating unit 180 to determine whether to update the analysis model (S250). If a timing for updating the analysis model is preset, the control unit 150 may cause the updating unit 180 to determine whether to update the analysis model upon reaching the update timing. The updating unit 180 evaluates the analysis model generated and learned by the learning unit 160, and determines whether to update the analysis model to be used by the examining unit 190 based on the evaluation result. The evaluation result of the learned analysis model is referred to as a first evaluation result. For example, the updating unit 180 compares the first evaluation result and the evaluation result of the analysis model being used by the examining unit 190 (referred to as a second evaluation result).

The updating unit 180 may use, as at least one of the first evaluation result and the second evaluation result, the result of evaluation by the learning unit 160 on the analysis model at the time of generation of the analysis model. The updating unit 180 may also calculate at least one of the first evaluation result and the second evaluation result by evaluating a new analysis model. For the evaluation of analysis models, the evaluation on their examination accuracy such as self-checking, cross-validation or the like may be used. For the evaluation of analysis models, the degree of generalization of the analysis models or the like may also be used. In this case, the updating unit 180 may perform evaluation by calculating a formulated generalization coefficient for each analysis model.

If the second evaluation result is higher than the first evaluation result (S250: No), the updating unit 180 does not update the analysis model. In this case, the control unit 150 may advance the process to the examination of the facilities 10 (S270). If a timing for updating the analysis model is set and when the update timing is not reached, the updating unit 180 may also not update the analysis model.

If the first evaluation result is higher than or equal to the second evaluation result (S250: Yes), the updating unit 180 updates the analysis model (S260). That is, the updating unit 180 replaces the analysis model being used by the examining unit 190 with the analysis model generated and learned by the learning unit 160. If the analysis model used by the examining unit 190 is stored in the storage unit 140, the updating unit 180 may update the analysis model in the storage unit 140.

Next, the examining unit 190 examines the facilities 10 by using the analysis model (S270). If the updating unit 180 has updated the analysis model, the examining unit 190 examines the facilities 10 by using the analysis model learned by the learning unit 160. If the updating unit 180 has not updated the analysis model, the examining unit 190 may examine the facilities 10 by using an analysis model learned by the learning unit 160 prior to the present cycle.

The examining unit 190 may apply, to the analysis model, the sensor data acquired in the present cycle by the sensor data acquiring unit 110 from each targeted sensor included in the targeted group, to calculate the examination result of the facilities 10 for the present cycle. Note that, if the group designation acquiring unit 120 acquires the designation of a plurality of targeted groups, the examining unit 190 may examine the facilities 10 by using a plurality of learned analysis models respectively associated with the plurality of targeted groups.

Next, the examining unit 190 determines whether the examination result indicates an abnormality in the facilities 10 (S280). If the examination result of the examining unit 190 indicates an abnormality in the facilities 10 (S280: Yes), the alarm output unit 200 outputs an alarm (S290). The alarm output unit 200 may output the alarm to a designated alarm notification destination. For example, if an e-mail address is set as an alarm notification destination, the alarm output unit 200 sends an e-mail indicating the alarm to the e-mail address. As an example, the alarm output unit 200 outputs, as the alarm, information including the time of examination, the name of the facility 10 and the like.

Next, the user interface unit 130 acquires feedback on the examination result obtained by using the analysis model (S300). The user of the examining apparatus 100 receives the alarm from the alarm output unit 200 to, for example, confirm an abnormality in the facilities 10. If the facilities 10 are actually in abnormal operation, the user may execute a process for recovering the facilities 10 into normal operation, or may stop the facilities 10. The user may also conduct progress monitoring, depending on the operational state. Then, the user may input feedback on the examination result to the examining apparatus 100 to improve the accuracy of the next examination by the examining apparatus 100.

That is, the user interface unit 130 receives the input of feedback indicating whether the alarm received by the user is correct. The user may input the suspension of determination besides the indication of whether the alarm is correct, or may collectively input feedback later. The user may also input, to the user interface unit 130, the indication of whether the operation is normal when completing a periodic round of inspection of the facilities 10, for example, not only when receiving the alarm. That is, if the examining unit 190 indicates an examination result of normality (No in Step S280), feedback may be made following the confirmation by a round of inspection or the like that the examination result of normality is correct. When receiving an e-mail conveying the alarm, the user may return the feedback via e-mail, or may alternatively input the feedback by using dedicated application software. The user interface unit 130 stores feedback information in the storage unit 140.

After the user interface unit 130 stores the feedback information in the storage unit 140, or if the examination result of the examining unit 190 indicates normal operation of the facilities 10 in S280 (S280: No), the examining apparatus 100 determines whether to continue to examine the facilities 10 (S310). If the examining apparatus 100 continues to examine the facilities 10 (S310: No), the process returns to S220, and the sensor data acquiring unit 110 acquires sensor data for the next timing to start the next examination of the facilities 10.

Alternatively, the examining apparatus 100 terminates the examination of the facilities 10 according to an input by the user or the like (S310: Yes). The examining apparatus 100 may also terminate the examination of the facilities 10 according to schedule such as upon completion of a predetermined number of times of examination, upon completion of a predetermined number of times of learning, or the like.

As described above, the examining apparatus 100 according to the present embodiment examines the facilities 10 by applying a learned analysis model to the sensor data, and thus can perform the examining operation regardless of user's experience. Also, the examining apparatus 100 groups sensors 20 used for the examination of the facilities 10 into a targeted group, and thus can perform learning with high accuracy by using information correlated with the operation of the facilities 10. In this manner, the examining apparatus 100 does not require the user to check the correlations between a plurality of pieces of sensor data, to perform the examination based on such correlations, and the like, and thus can accurately examine the facilities 10 even if the user does not have sufficient knowledge and experience. Also, receiving feedback information allows learning to be performed with high accuracy. The following describes the learning operation of the examining apparatus 100.

Figure 3:
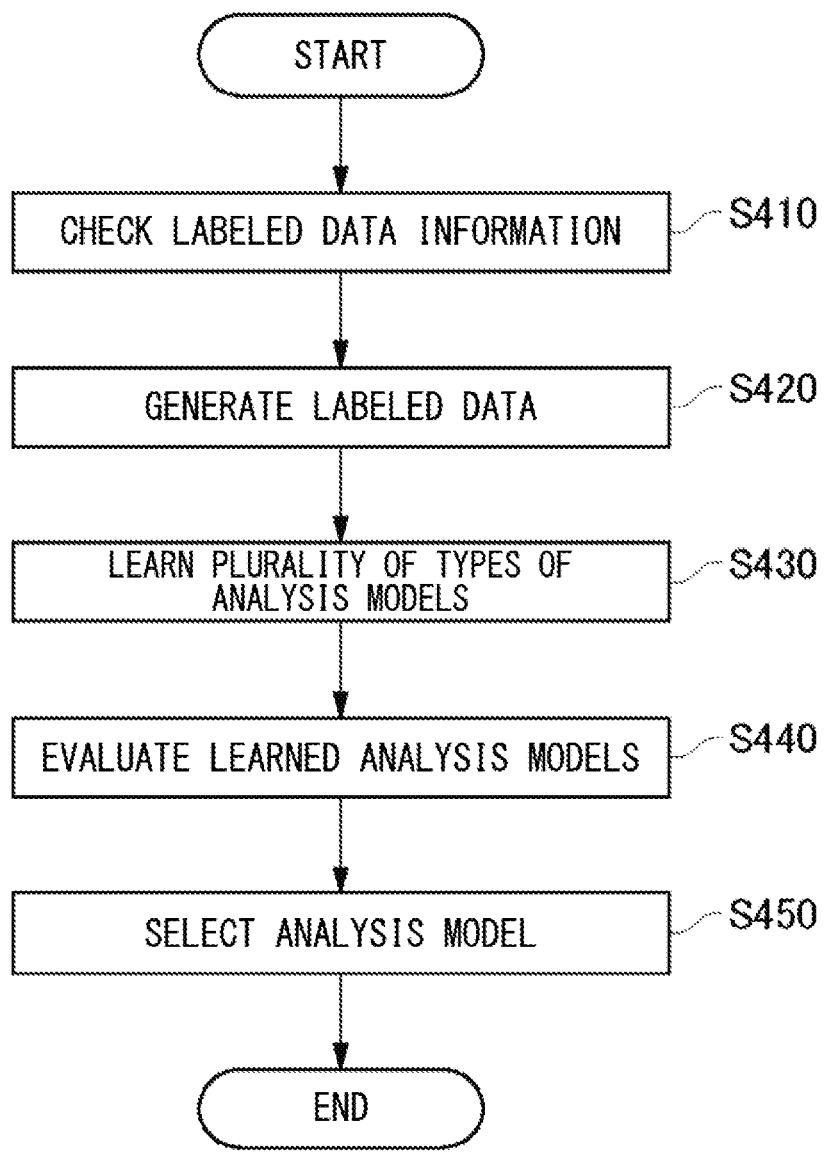
FIG. 3 shows an example of the operation flow of the examining apparatus 100 according to the present embodiment for generating an analysis model.

FIG. 3 shows an example of the operation flow of the examining apparatus 100 according to the present embodiment for generating an analysis model. FIG. 3 shows an example of the specific operations in S240 in the operation flow of FIG. 2. That is, the learning unit 160 and model selecting unit 170 of the examining apparatus 100 generate an analysis model to be used for examining the examining apparatus 100 by performing the operation flow shown in FIG. 3.

First, the learning unit 160 checks information of labeled data stored in the storage unit 140 (S410). For example, the learning unit 160 checks the presence or absence of labeled data input by the user, the presence or absence of labeled data previously generated, the presence or absence of feedback information, and the like.

Next, the learning unit 160 generates labeled data based on the checked information of labeled data (S420). For example, if information of feedback on an alarm output by the alarm output unit 200 is present in the storage unit 140, the learning unit 160 generates labeled data based on the feedback information. If there is information of an operational state checked by the user making a round of inspection of the facilities 10 or the like, the learning unit 160 may generate labeled data based on the information. The learning unit 160 may generate labeled data by labeling, with each piece of feedback, the portion of the sensor data from each targeted sensor included in the targeted group, on which portion the feedback is made.

As an example, the learning unit 160 labels the portion of sensor data as "NG", on which portion feedback is made by the user following the confirmation of abnormal operation of the facilities 10. The learning unit 160 may also label the portion of sensor data as "OK", on which portion feedback is made by the user following the confirmation of normal operation of the facilities 10. If a period of sensor data with no feedback is present between two periods labeled as "NG", the learning unit 160 may label the period as "OK". The learning unit 160 may store the generated labeled data in the storage unit 140. The learning unit 160 may use the generated labeled data for learning analysis models. In this manner, the learning unit 160 can perform learning by regarding the sensor data with "OK" labels as being normal values and the sensor data with "NG" labels as being abnormal values, thus reflecting feedback information.

Note that, if no feedback information is present in the storage unit 140, the learning unit 160 may use labeled data previously generated and stored in the storage unit 140 for learning. If labeled data input by the user is present in the storage unit 140, the learning unit 160 may also use the input labeled data for learning. It is desirable for the learning unit 160 to use the labeled data stored in the storage unit 140 at the most recent time. If a plurality of pieces of labeled data are stored in the storage unit 140 within a predetermined period, the learning unit 160 may also use the plurality of pieces of labeled data for learning. If there is no information of labeled data in the storage unit 140, the learning unit 160 may not use labeled data.

Next, the learning unit 160 learns a plurality of types of analysis models (S430). The learning unit 160 may learn each of a plurality of predetermined types of analysis models by using sensor data from the targeted sensors. The plurality of types of analysis models may include linear analysis models, non-linear analysis models, and the like. For example, the plurality of types of analysis models include at least one of regression analysis, cluster analysis, principal component analysis, vector quantization, self-organizing maps, neural networks, support vector machines, ID3, naive Bayes classifiers, and the like. The learning unit 160 may learn each of the plurality of types of analysis models by means of supervised learning, unsupervised learning or the like, depending on the analysis model.

For example, the learning unit 160 learns a first analysis model among the plurality of types of analysis models by means of supervised learning using sensor data from each targeted sensor included in the targeted group and an examination result that should be output as an examination result of the facilities 10. In this case, the learning unit 160 may learn a second analysis model among the plurality of types of analysis models by means of unsupervised learning using sensor data from each targeted sensor included in the targeted group. If there is no labeled data to be used, the learning unit 160 may learn the second analysis model only by means of unsupervised learning and may not learn the first analysis model. Note that the first analysis model and the second analysis model may each include a plurality of types of analysis models.

If an analysis model learned by the previous cycle is stored in the storage unit 140, the learning unit 160 may continue learning by applying the sensor data acquired in the present cycle to the analysis model. The learning unit 160 may store the learned plurality of types of analysis models in the storage unit 140 after the end of learning for the present cycle. Note that, if analysis models have not been generated due to the insufficiency of labeled data or the like, the learning unit 160 may not store this information in the storage unit 140.

Next, the model selecting unit 170 evaluates the learned analysis models (S440). The model selecting unit 170 may evaluate all the learned analysis models. Note that the model selecting unit 170 may not evaluate the analysis models that have not been generated due to the insufficiency of labeled data or the like. The model selecting unit 170 may evaluate the analysis models by means of at least one of self-checking, cross-validation, the degree of generalization of the analysis models and the like, for example.

Next, the model selecting unit 170 selects at least one candidate for the analysis model to be used for examining the facilities 10 from among the learned plurality of types of analysis models (S450). For example, the model selecting unit 170 may select the analysis model to be used for examining the facilities 10 based on the result of evaluation on examination accuracy or the like. As an example, the model selecting unit 170 selects the analysis model with the highest evaluation result. The model selecting unit 170 supplies the selected analysis model to the updating unit 180 as the generated analysis model. The model selecting unit 170 may also store the selected analysis model in the storage unit 140 together with the evaluation result.

As described above, the learning unit 160 and model selecting unit 170 according to the present embodiment select an analysis model with a higher evaluation result among a plurality of analysis models as the analysis model to be used for examining the facilities 10. In this manner, the examining apparatus 100 can examine the facilities 10 by using a more appropriate analysis model.

For example, during a relatively early operation period, from when the examining apparatus 100 starts an operation of examining the facilities 10 until when several to a dozen of examination results are output, a sufficient amount of labeled data for learning may not be generated due to the insufficiency of learning data. In this case, the model selecting unit 170 shows a tendency to select an analysis model learned by means of unsupervised learning, so that an analysis model with insufficient supervised learning can be prevented from being used for examination.

If the examining apparatus 100 operates for a relatively long time period so that learning data is sufficiently accumulated for analysis model learning, the analysis model learned by means of supervised learning will have a higher evaluation result. In this case, the model selecting unit 170 shows a tendency to select the analysis model learned by means of supervised learning. By continuing learning a plurality of types of analysis models in this manner, the examination accuracy or the like of each analysis model can be improved, so that the model selecting unit 170 can select an appropriate analysis model according to the examination accuracy or the like. Further, the model selecting unit 170 can select an appropriate analysis model which, even when the tendency of sensor data varies, maintains high examination accuracy accordingly.

Moreover, since the examining apparatus 100 generates labeled data according to feedback by the user, it only requires the user to check the operation of the facilities 10 to accumulate labeled data so as to improve examination accuracy. That is, even if the user's knowledge and experience or the knowledge and experience about examination know-how for each facility 10 are not improved, the examination accuracy of the examining apparatus 100 can be improved, so that the system can be developed.

Figure 4:
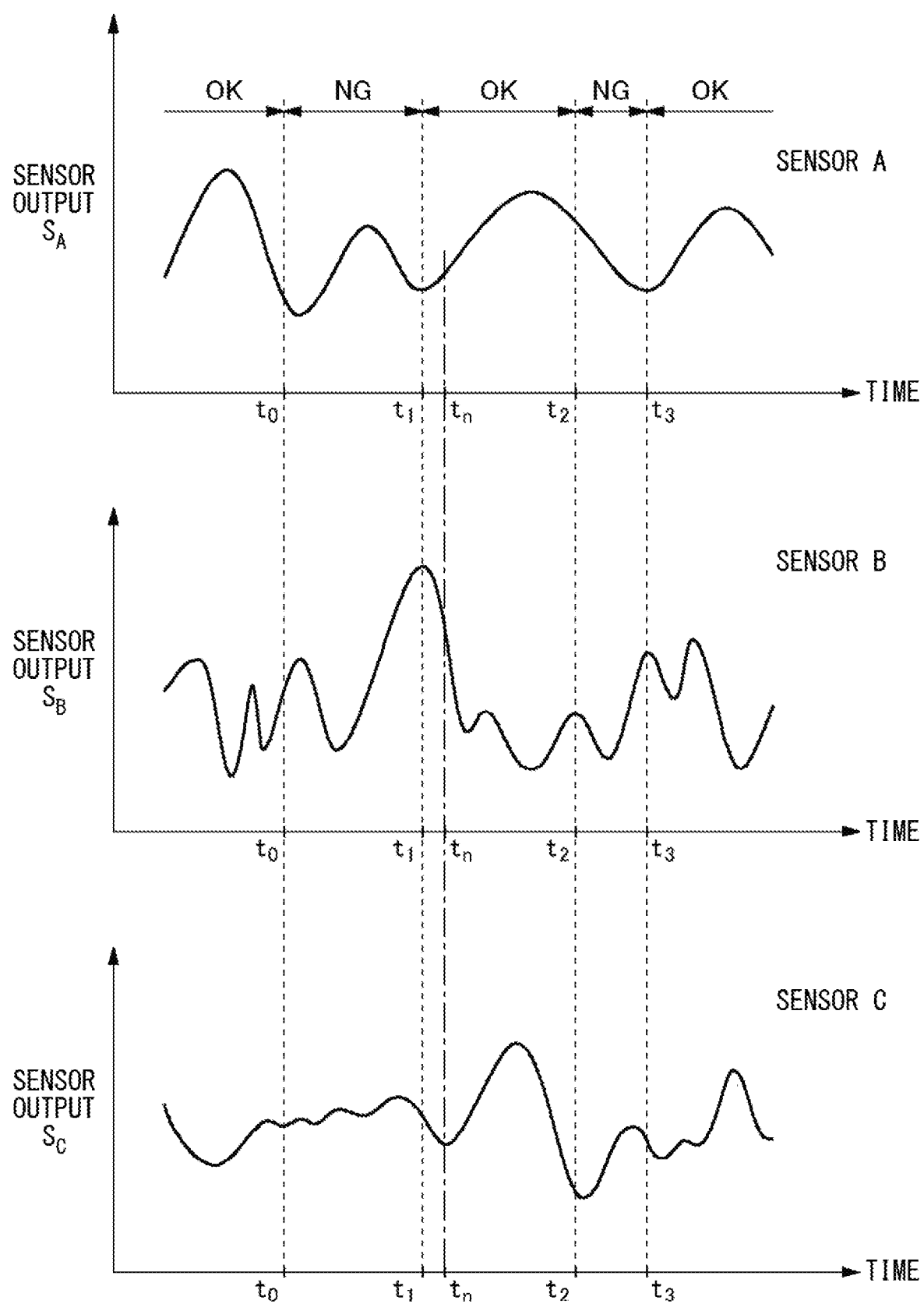
FIG. 4 shows an example of sensor data acquired by a sensor data acquiring unit 110 according to the present embodiment.

FIG. 4 shows an example of sensor data acquired by the sensor data acquiring unit 110 according to the present embodiment. In FIG. 4, the horizontal axis indicates time, and the vertical axis indicates sensor outputs such as voltage or current, for example. FIG. 4 shows an example of sensor data acquired from three sensors 20: a sensor A, a sensor B and a sensor C, among the plurality of targeted sensors.

Since each targeted sensor outputs sensing results for the facilities 10 over time as shown in the example of FIG. 4, it is difficult for the user to check all the sensor data to examine the facilities 10. Thus, the examining apparatus 100 according to the present embodiment uses analysis models, as described above, to examine the facilities 10 based on a plurality of pieces of sensor data as shown in FIG. 4.

The examining apparatus 100 may examine the facilities 10 for each piece of sensor data acquired by the sensor data acquiring unit 110 on a time-series basis. The sensor outputs of the sensor A, sensor B, sensor C, etc. at time $t_n$ are respectively referred to as $S_{An}$, $S_{Bn}$, $S_{Cn}$, etc. In this case, for the examining apparatus 100, the sensor data of the targeted sensors at time $t_n$ is referred to as $S_n$ ($S_{An}$, $S_{Bn}$, $S_{Cn}$, ..., $S_{Mn}$). Note that the number of the targeted sensors is set to M.

The examining unit 190 applies this M-dimensional sensor data $S_n$ to a learned analysis model, to calculate the examination result of the facilities 10 at time $t_n$. That is, the analysis model may function as a learning model for classifying the operational state of the facilities 10 by means of M-dimensional data analysis. The examining unit 190 classifies the operational state of the facilities 10 as any one of at least a normal state and an abnormal state, which is used as an examination result. Similarly, the examining unit 190 applies the sensor data acquired at each time $t_{n+1}$, $t_{n+2}$, etc., as $S_{n+1}$ ($S_{An+1}$, $S_{Bn+1}$, $S_{Cn+1}$, ..., $S_{Mn+1}$), $S_{n+2}$ ($S_{An+2}$, $S_{Bn+2}$, $S_{Cn+2}$, ..., $S_{Mn+2}$), etc., to the analysis model, to calculate the examination result of the facilities 10 at each time.

When an examination result indicates the abnormal state, the alarm output unit 200 notifies the user of the examination result and the time at which the sensor data is detected, by way of an alarm. The user inputs feedback on the notified alarm to the user interface unit 130. The learning unit 160 generates labeled data based on the input of the feedback.

FIG. 4 shows an example of labeled data generated by the learning unit 160 by adding information of feedback by the user (information of "OK" and "NG" shown in FIG. 4) to sensor data in this manner. For example, the period from time $t_0$ to time $t_1$ and the period from time $t_2$ to time $t_3$ indicate the portions of sensor data on which feedback is made by the user following the confirmation of abnormal operation of the facilities 10. Thus, if the labeled data shown in FIG. 4 is used, it is desirable for the learning unit 160 to learn analysis models by regarding the period from time $t_0$ to time $t_1$ and the period from time $t_2$ to time $t_3$ as abnormal operation periods and the period until time $t_0$, the period from time $t_1$ to time $t_2$ and the period from time $t_3$ onward as normal operation periods.

Note that, while in the above-described example the examining apparatus 100 applies the sensor data $S_n$ ($S_{An}$, $S_{Bn}$, $S_{Cn}$, ..., $S_{Mn}$), which is based on the instantaneous value of each targeted sensor at time $t_n$, to the analysis model, the sensor data is not so limited. The examining apparatus 100 may generate and use M-dimensional sensor data composed of the average value, maximum value, minimum value or the like of each targeted sensor in a predetermined period. The examining apparatus 100 may also use, as the sensor data, the instantaneous value of each targeted sensor in a predetermined period.

The model selecting unit 170 may also use the learning data shown in FIG. 4 to evaluate analysis models. For example, the model selecting unit 170 allows an analysis model to be learned by using the sensor data of a partial period from time $t_0$ to time $t_1$ and the sensor data of a partial period from time $t_1$ to time $t_2$. Then, the learned analysis model is applied to calculate the examination results for the sensor data of the remaining partial period from time $t_0$ to time $t_1$ and the sensor data of the remaining partial period from time $t_1$ to time $t_2$, so that the model selecting unit 170 evaluates the examination accuracy of the analysis model. In this manner, the model selecting unit 170 can self-check the analysis model by using the data of a period in which the operation of the facilities 10 is known.

If the learning unit 160 generates labeled data including a plurality of abnormal operation periods and a plurality of normal operation periods, the model selecting unit 170 may also evaluate the analysis model by means of cross-validation using the labeled data. As described above, the examining apparatus 100 examines the sensor data acquired from the targeted sensors by using an analysis model while learning the analysis model by using labeled data obtained based on feedback on the examination result.

Note that the labeled data used by the examining apparatus 100 according to the present embodiment is not limited to the data obtained based on feedback by the user. The examining apparatus 100 may use labeled data prepared in advance by the user, or may use labeled data obtained based on information of the facilities 10 such as their operational history, operational environment, operational conditions or the like. The following describes an example where the examining apparatus 100 generates labeled data based on information of the operational history of the facilities 10.

Figure 5:
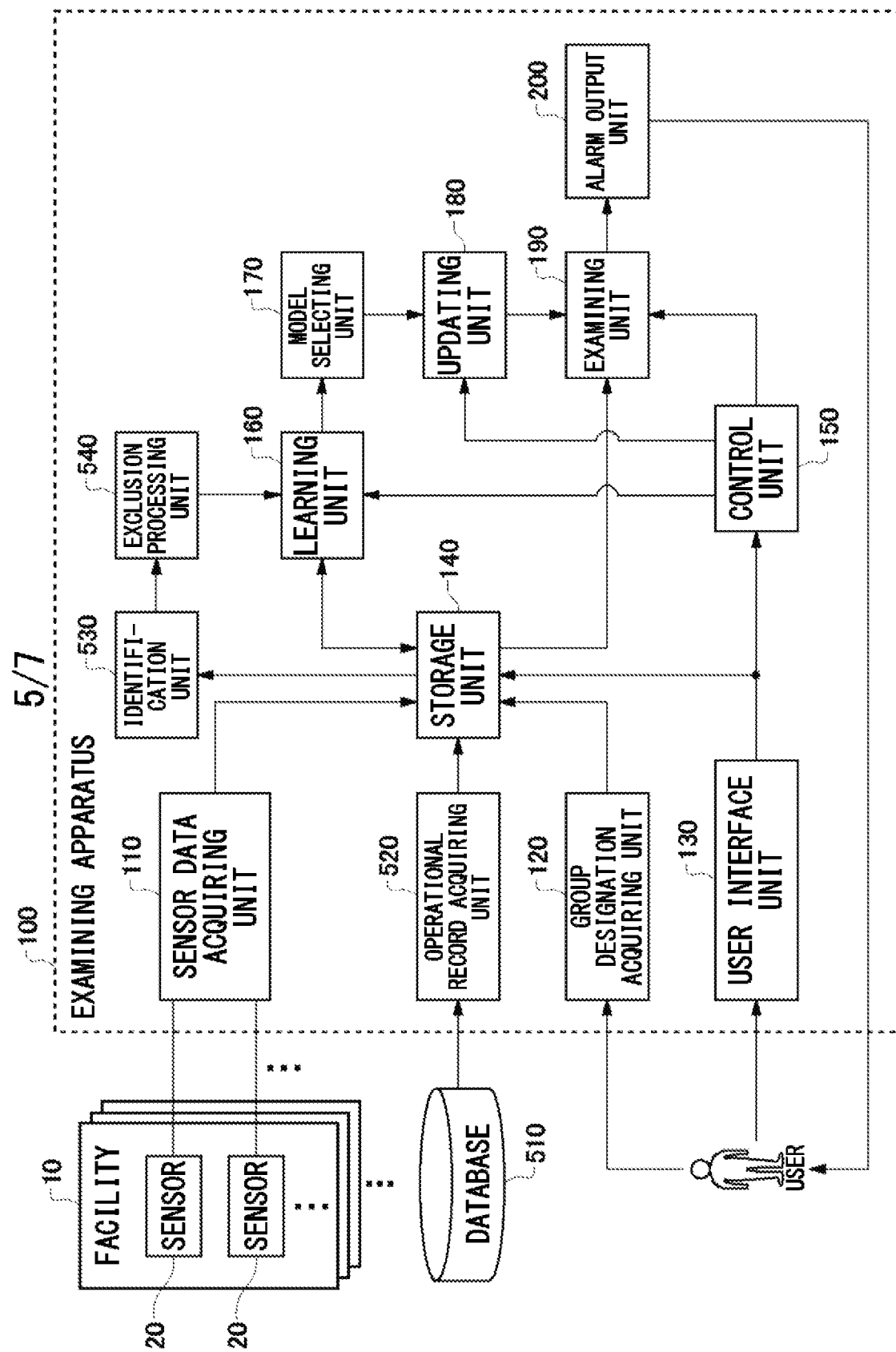
FIG. 5 shows a modified example of the examining apparatus 100 according to the present embodiment.

FIG. 5 shows a modified example of the examining apparatus 100 according to the present embodiment. In the modified example of the examining apparatus 100, the same references are given to the elements that operate in substantially the same manner as those of the examining apparatus 100 according to the present embodiment shown in FIG. 1, and their descriptions are omitted. The examining apparatus 100 in the modified example further includes an operational record acquiring unit 520, an identification unit 530 and an exclusion processing unit 540.

The operational record acquiring unit 520 acquires operational records of the facilities 10. The operational record acquiring unit 520 may acquire the operational records of the facilities 10 from an external database 510 or the like. The database 510 may store operational records including at least some of periodic inspection results, abnormality-responsive inspection results, alarm results, operations history, facility maintenance data, facility running records, facility abnormality records and the like, for each of the facilities 10. The operational record acquiring unit 520 stores the acquired operational records in the storage unit 140.

The identification unit 530 identifies, based on the operational records, a period in which analysis model learning is not to be performed. The sensor data acquired by the sensor data acquiring unit 110 may contain data that is not desirable to be used as learning data. For example, if the sensor data obtained during a period of maintenance, stop, startup, test run or the like of the facilities 10, in which the facilities 10 are not regularly running (e.g., actually operating), is used for learning, it does not improve examination accuracy but rather lowers learning efficiency in some cases. Thus, the identification unit 530 identifies, based on the operational records, at least one of a maintenance period of the facilities 10, a stop period of the facilities 10, a startup period of the facilities 10 and a test running period of the facilities 10, as a period in which analysis model learning is not to be performed.

The exclusion processing unit 540 excludes, from the targets for learning, the piece of the sensor data from each targeted sensor included in the targeted groups, which piece corresponds to the period in which analysis model learning is not to be performed. For example, the exclusion processing unit 540 deletes the piece of the sensor data of all the targeted sensors included in a targeted group, which piece is of the period in which learning is not to be performed. The exclusion processing unit 540 may also label the period of the sensor data in which learning is not to be performed, to specify that the data is to be excluded from the targets for learning. The exclusion processing unit 540 may store processed data in the storage unit 140. In this case, the exclusion processing unit 540 may overwrite unprocessed sensor data.

The examining apparatus 100 in the modified example as described above can acquire information specific to the facilities 10 (their domain information) and select data targeted for learning, and thus the examination accuracy of the facilities 10 can be efficiently improved. The examining apparatus 100 in the modified example may examine the facilities 10 by performing substantially the same operation flow as the operation flow shown in FIG. 2. Note that the operational record acquiring unit 520 may acquire the operational records of the facilities 10 at a predetermined timing or the like. For example, the operational record acquiring unit 520 acquires the operational records of the facilities 10 after the acquisition of sensor data in S220. The operation flow for generating the analysis model as shown in FIG. 3 (the operations in S240 in FIG. 2) may be modified as described below.

Figure 6:
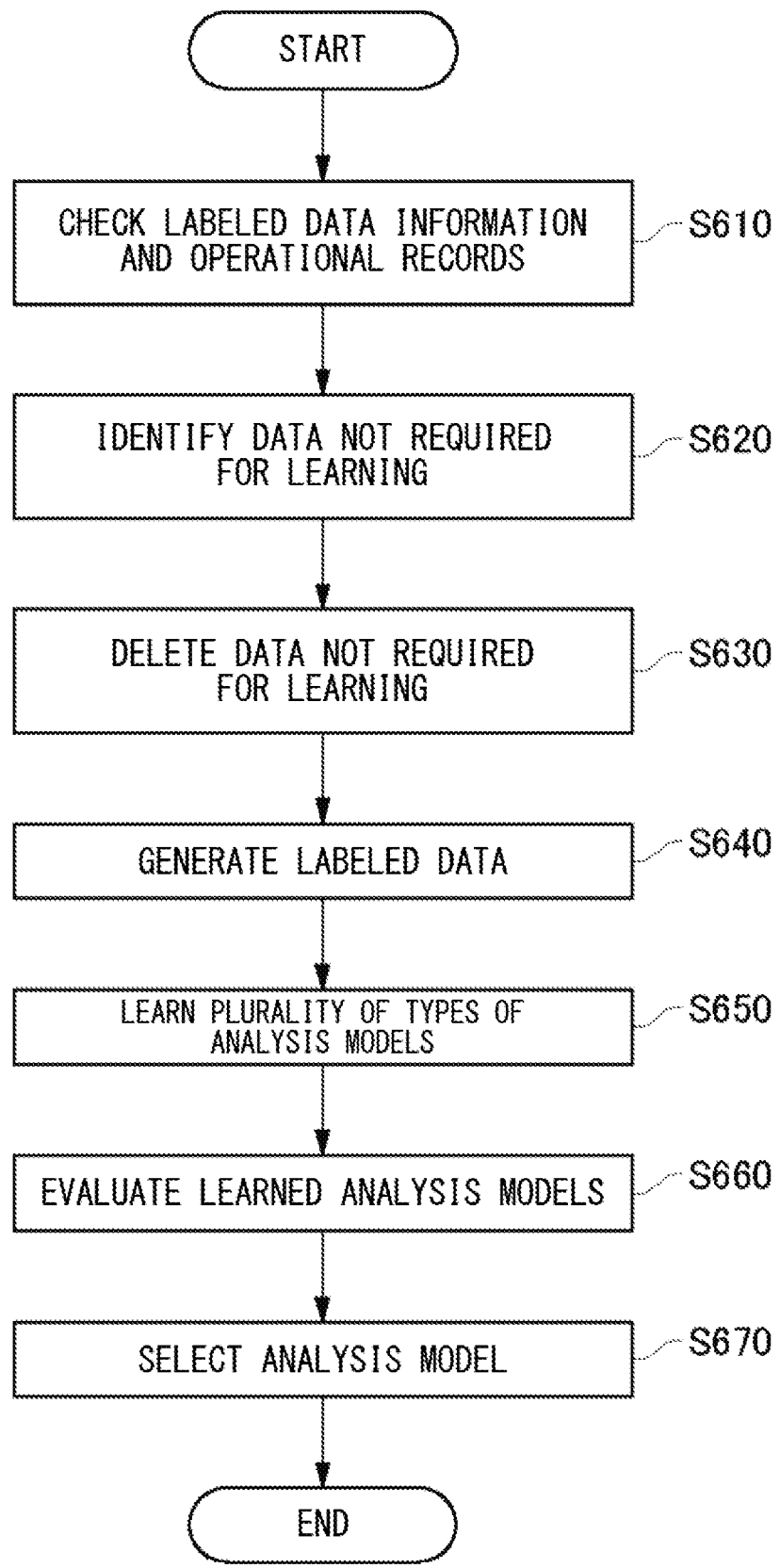
FIG. 6 shows an example of the operation flow of the examining apparatus 100 according to the modified example for generating an analysis model.

FIG. 6 shows an example of the operation flow of the examining apparatus 100 according to the modified example for generating an analysis model. That is, the identification unit 530, exclusion processing unit 540, learning unit 160 and model selecting unit 170 of the examining apparatus 100 in the modified example generate an analysis model by performing the operation flow shown in FIG. 6.

First, the identification unit 530 checks information of labeled data and operational records stored in the storage unit 140 (S610). For example, the identification unit 530 checks the presence or absence of labeled data input by the user, the presence or absence of labeled data previously generated, the presence or absence of feedback information, the presence or absence of information of operational records, and the like.

Next, the identification unit 530 identifies data not required for learning, based on the checked information of the labeled data and operational records (S620). For example, the identification unit 530 identifies, based on the timestamps in sensor data to be used as labeled data, a period in which analysis model learning is not to be performed, i.e. at least one of a maintenance period of the facilities 10, a stop period of the facilities 10, a startup period of the facilities 10 and a test running period of the facilities 10, as data not required for learning. For example, the identification unit 530 compares the period information indicating these periods included in the operational records and the timestamps in the sensor data, and identifies the data whose timestamp falls within a period indicated by the period information, as the data not required for learning.

Next, the exclusion processing unit 540 deletes the data not required for learning from the sensor data to be used as labeled data (S630). The exclusion processing unit 540 supplies, to the learning unit 160, the sensor data from which the data not required for learning is deleted. Note that, if the operational records are not present in the storage unit 140, the identification unit 530 and exclusion processing unit 540 may supply, to the learning unit 160, the sensor data to be used as labeled data, from which no data is deleted.

The learning unit 160 generates labeled data by using the received sensor data (S640). For example, if information of feedback on an alarm output by the alarm output unit 200 is present in the storage unit 140, the learning unit 160 generates labeled data based on the feedback information. The learning unit 160 may generate labeled data by labeling, with each piece of feedback, the portion of the received sensor data on which the feedback is made.

Next, the learning unit 160 learns a plurality of types of analysis models (S650). Next, the model selecting unit 170 evaluates the learned analysis models (S660). Next, the model selecting unit 170 selects a candidate for the analysis model to be used for examining the facilities 10 from among the learned plurality of types of analysis models (S670). The above operation flow from S650 to S670 may be substantially the same as the operation flow from S430 to S450 in FIG. 3, and their descriptions are omitted herein.

As described above, the examining apparatus 100 in the modified example can efficiently learn a more appropriate analysis model by using sensor data of a period appropriate for learning, and use the learned analysis model for examining the facilities 10. Further, the examining apparatus 100 in the modified example excludes sensor data inappropriate for learning, and thus can improve examination accuracy. Moreover, the examining apparatus 100 in the modified example acquires the domain information of the facilities 10 from the external database 510 or the like, and thus can automatically perform efficient learning operations even in the absence of users with knowledge and experience specific for the facilities 10.

In the examining apparatus 100 according to the present embodiment described above, the model selecting unit 170 selects the analysis model to be used for examining the facilities 10 from among a plurality of types of analysis models. The model selecting unit 170 may also select a plurality of analysis models with higher evaluation results. In this case, the examining unit 190 examines the operation of the facilities 10 by using the plurality of analysis models. For example, the examining unit 190 may examine the operation of the facilities 10 by using each of the plurality of analysis models, and may output the final examination result by means of majority decision, OR condition or the like among the plurality of examination results.

In the described example of the examining apparatus 100 according to the present embodiment, the learning unit 160 learns a plurality of types of analysis models by using sensor data from targeted sensors included in a targeted group. The learning unit 160 may also use the sensor data of all the targeted sensors included in the targeted group, or may alternatively use some sensor data. The learning unit 160 may also perform learning by using different types of sensor data for at least some of the plurality of types of analysis models.

For example, the learning unit 160 learns a third analysis model among the plurality of types of analysis models by using the sensor data of all the targeted sensors included in the targeted group. The learning unit 160 learns a fourth analysis model among the plurality of types of analysis models by using the sensor data from each targeted sensor, except for some targeted sensors, included in the targeted group. The model selecting unit 170 may select the fourth analysis model when sensor data of sensors in normal operation cannot be acquired from the some targeted sensors included in the targeted group.

The sensors 20, monitoring the state of the facilities 10, have various characteristics and, for example, some sensors 20 may have at least one of a sensitive but fragile characteristic and a short-lived characteristic. Thus, the learning unit 160 continues learning for the third analysis model by using all the sensor data including the sensor data from these sensors, and continues learning for the fourth analysis model without using the sensor data from these sensors.

In this manner, if sensor data can be acquired from these sensors, the third analysis model reflecting the learning by using the data from the sensors, which are sensitive and can detect slight changes in state of the facilities, can be used for examining the facilities 10. If the third analysis model is used such as when these sensors are broken or dead and their sensor data in normal operation can no longer be acquired, sensor data that is not of their normal operation would be included for learning. In this case, the fourth analysis model can instead be used to continue to examine the facilities 10.

Although in the above-described example the examining apparatus 100 according to the present embodiment examines the facilities 10 while learning analysis models, this is not so limited. For example, the examining apparatus 100 may perform only the examining operation, with the learned analysis model being fixed. In this case, the examining apparatus 100 may operate to select No in S230 in the operation flow shown in FIG. 2. Note that the examining apparatus 100 may perform the operation flow from S280 onward if feedback information is to be acquired, and may operate to select No in S280 if feedback information is not required.

Also, in the described example of the examining apparatus 100 according to the present embodiment, the user checks the actual state of the facilities 10 with respect to an examination result of the examining apparatus 100 and inputs feedback. The user, who checks the state of the facilities 10, may be able to input more appropriate feedback to the examining apparatus 100 by virtue of his knowledge, experience and the like. In addition, depending on the timing of checking the state of the facilities 10, the correspondence between the sensor data and the operation of the facilities 10 may be inaccurate.

Thus, the user interface unit 130 may set weighting coefficients according to the user's knowledge, experience, skill, feedback timing or the like. The user interface unit 130 may store the weighting coefficients in the storage unit 140 in association with feedback information. In this manner, the learning unit 160 can perform analysis model learning in consideration of weight, improving examination accuracy. Note that the units of the examining apparatus 100 may be implemented by means of a single apparatus, or may be implemented by means of separate apparatuses in a distributed manner. The single apparatus or separate apparatuses may be implemented on a cloud network or the like.

Although in the above-described example the examining apparatus 100 according to the present embodiment examines the state of the facilities 10 while learning analysis models, this is not so limited. Since the examining apparatus 100 examines the state of the facilities 10 by using analysis models, the state of the facilities 10 can be indicated in a multi-valued manner, for example. In this case, the examining apparatus 100 may be able to detect a temporal transition of the state of the facilities 10 from a normal state to an abnormal state. That is, the examining apparatus 100 may be able to predict that the facilities 10 are going to transition to an abnormal state. For example, it may be able to predict that the facilities 10 transition from the present state of a low degree of corrosion to a state of a middle or high degree of corrosion. The examining apparatus 100 can also improve the accuracy of such prediction by continuing the learning of the analysis model.

Various embodiments of the present invention may be described with reference to flowcharts and block diagrams whose blocks may represent (1) steps of processes in which operations are performed or (2) units of apparatuses responsible for performing operations. Certain steps and units may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Computer-readable media may include any tangible device that can store instructions for execution by a suitable device, such that the computer-readable medium having instructions stored therein comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY® disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA, C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., to execute the computer-readable instructions to create means for performing operations specified in the flowcharts or block diagrams. Examples of processors include computer processors, processing units, microprocessors, digital signal processors, controllers, microcontrollers, etc.

Figure 7:
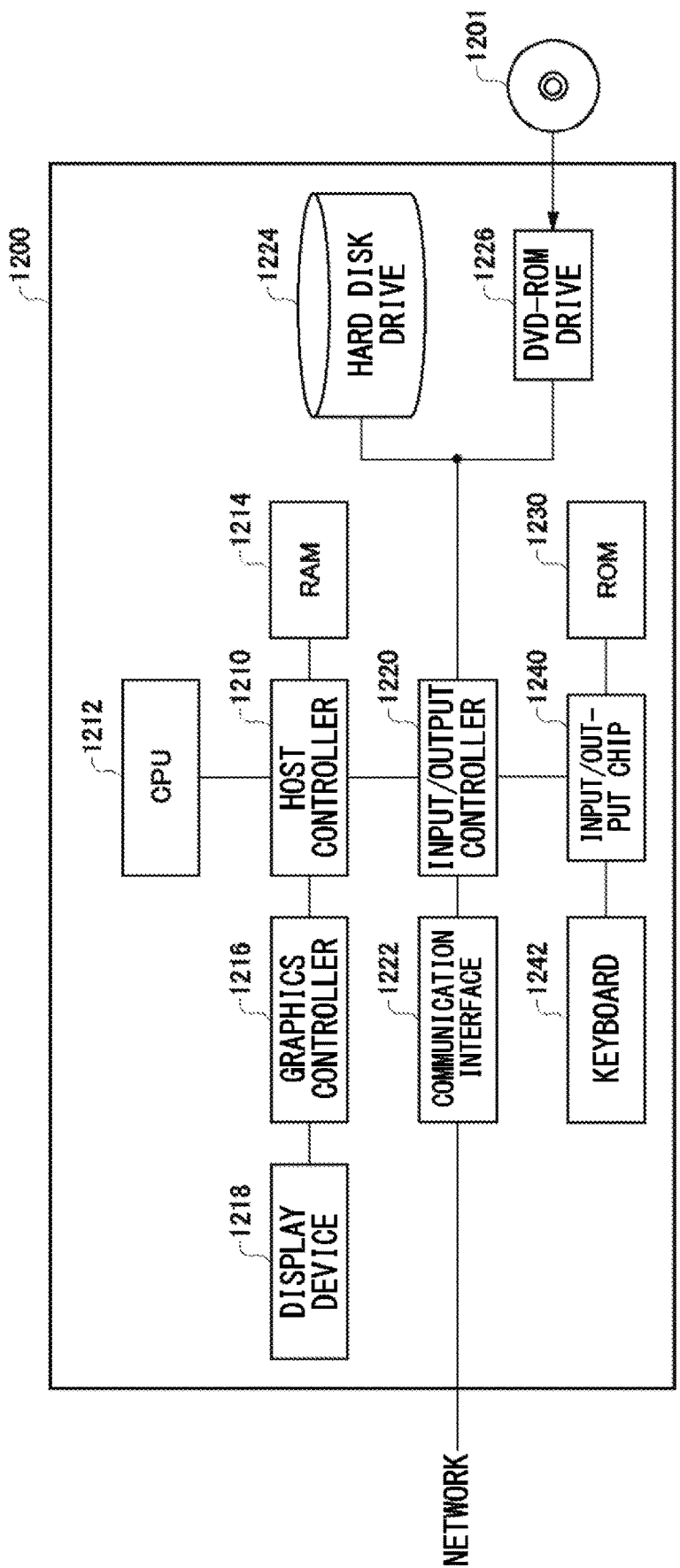
FIG. 7 shows an example configuration of a computer 1200 in which all or some aspects of the present invention can be embodied.

FIG. 7 shows an example configuration of a computer 1200 in which all or some aspects of the present invention can be embodied. A program installed on the computer 1200 can cause the computer 1200 to function as an operation associated with an apparatus according to embodiments of the present invention or as one or more "unit(s)" of the apparatus, or to perform the operation or the one or more "unit(s)", and/or can cause the computer 1200 to perform processes according to embodiments of the present invention or steps of the processes. Such a program may be executed by a CPU 1212 to cause the computer 1200 to perform particular operations associated with some or all blocks in the flowcharts or block diagrams described herein. Processes according to embodiments of the present invention or steps of the processes may also be performed on a cloud network or the like.

The computer 1200 according to the present embodiment includes a CPU 1212, a RAM 1214, a graphics controller 1216 and a display device 1218, which are connected to each other by a host controller 1210. The computer 1200 also includes input/output units such as a communication interface 1222, a hard disk drive 1224, a DVD-ROM drive 1226 and an IC card drive, which are connected to the host controller 1210 via an input/output controller 1220. The computer also includes legacy input/output units such as a ROM 1230 and a keyboard 1242, which are connected to the input/output controller 1220 via an input/output chip 1240.

The CPU 1212 operates in accordance with programs stored in the ROM 1230 and the RAM 1214, and controls each unit accordingly. The graphics controller 1216 acquires image data generated by the CPU 1212 on a frame buffer or the like provided in the RAM 1214 or in the graphics controller 1216 itself, and displays the image data on the display device 1218.

The communication interface 1222 communicates with other electronic devices via a network. The hard disk drive 1224 stores programs and data to be used by the CPU 1212 in the computer 1200. The DVD-ROM drive 1226 reads programs or data from the DVD-ROM 1201, and provides the programs or data to the hard disk drive 1224 via the RAM 1214. The IC card drive reads programs and data from an IC card, and/or writes programs and data into an IC card.

The ROM 1230 has stored therein a boot program or the like to be executed by the computer 1200 at the time of activation, and/or a program that depends on the hardware of the computer 1200. The input/output chip 1240 may also connect various input/output units to the input/output controller 1220 via a parallel port, a serial port, a keyboard port, a mouse port or the like.

Programs are provided by a computer-readable storage medium such as the DVD-ROM 1201 or an IC card. The programs are read from the computer-readable storage medium, installed on the hard disk drive 1224, the RAM 1214 or the ROM 1230, which are also examples of a computer-readable storage medium, and executed by the CPU 1212. The information processing described in these programs are read by the computer 1200, so that the programs and the above-described various types of hardware resources cooperate. Apparatuses or methods may be constituted by implementing the operations or processing on information through the use of the computer 1200.

For example, if communication is made between the computer 1200 and external devices, the CPU 1212 may execute a communication program loaded on the RAM 1214, and instruct the communication interface 1222 to perform communication processing based on the processing described in the communication program. Under the control of the CPU 1212, the communication interface 1222 reads transmission data stored in a transmission buffer region provided in a recording medium such as the RAM 1214, the hard disk drive 1224, the DVD-ROM 1201 or an IC card, and sends the read transmission data to the network, or writes reception data received from the network into a reception buffer region or the like provided in the recording medium.

The CPU 1212 may also make all or required portions of the files or databases stored in an external recording medium such as the hard disk drive 1224, the DVD-ROM drive 1226 (DVD-ROM 1201) or an IC card to be read by the RAM 1214, and perform various types of processing on the data on the RAM 1214. The CPU 1212 may then write back the processed data to the external recording medium.

Various types of information such as various types of programs, data, tables and databases may be stored in the recording medium for information processing. The CPU 1212 may perform, on the data read from the RAM 1214, various types of processing including various types of operations, information processing, conditional determination, conditional branching, unconditional branching, information search/replacement and the like described throughout the present disclosure and designated by the instruction sequence of a program, and writes back the result to the RAM 1214. The CPU 1212 may also search the files, database or the like in the recording medium for information. For example, when a plurality of entries, each having an attribute value of a first attribute associated with an attribute value of a second attribute, are stored in the recording medium, the CPU 1212 may search the plurality of entries for an entry whose attribute value of the first attribute matches a designated condition, read the attribute value of the second attribute stored in the entry, and thereby acquire the attribute value of the second attribute associated with the first attribute that meets a predetermined condition.

The programs or software modules in the above description may be stored on the computer 1200 or a computer-readable storage medium near the computer 1200. Further, a recording medium such as a hard disk or a RAM provided in a server system connected to a dedicated communication network or the Internet can be used as a computer-readable storage media, which provides programs to the computer 1200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An examining apparatus comprising:
    at least one processor;
    a group designation acquiring section of the at least one processor, when executed by the at least one processor, configured to acquire designation of a targeted group including a plurality of targeted sensors to be analyzed among a plurality of sensors installed in at least one facility;
    a sensor data acquiring section of the at least one processor, when executed by the at least one processor, configured to acquire sensor data from each targeted sensor included in the targeted group;
    a machine learning section of the at least one processor, when executed by the at least one processor, configured to learn an analysis model by using the sensor data from each targeted sensor included in the targeted group; and
    an examining section of the at least one processor, when executed by the at least one processor, configured to examine the at least one facility by using the learned analysis model, wherein
    the machine learning section of the at least one processor is further configured to learn a plurality of types of analysis models by using the sensor data from each targeted sensor included in the targeted group,
    the examining apparatus further comprises a model selecting section of the at least one processor, when executed by the at least one processor, configured to select at least one analysis model used for examining the at least one facility from among the learned plurality of types of analysis models,
    the machine learning section of the at least one processor is further configured to learn a third analysis model among the plurality of types of analysis models by using the sensor data from all the targeted sensors included in the targeted group,
    the machine learning section of the at least one processor is further configured to learn a fourth analysis model among the plurality of types of analysis models by using the sensor data from each targeted sensor, except for some targeted sensors which remain operational during the machine learning of the fourth analysis model, included in the targeted group,
    the model selecting section of the at least one processor generates an evaluation result for the third analysis model and an evaluation result for the fourth analysis model using a formulated generalization coefficient for the third analysis model and for the fourth analysis model,
    when the generalization coefficient for the third analysis model is higher than the generalization coefficient for the fourth analysis model, the model selecting section of the at least one processor selects the third analysis model over the fourth analysis model, and
    when the generalization coefficient for the fourth analysis model is higher than the generalization coefficient for the third analysis model, the model selecting section of the at least one processor selects the fourth analysis model over the third analysis model.

2. The examining apparatus according to claim 1, further comprising a user interface section of the at least one processor, when executed by the at least one processor, configured to input feedback on an examination result obtained by using the analysis model, wherein
    the machine learning section of the at least one processor learns the analysis model by further using the feedback.

3. The examining apparatus according to claim 2, further comprising an alarm output section of the at least one processor, when executed by the at least one processor, configured to output an alarm if the examination result obtained by using the analysis model indicates an abnormality in the at least one facility, wherein
    the user interface section inputs the feedback indicating whether the alarm is correct.

4. The examining apparatus according to claim 3, further comprising a storage section of the at least one processor, when executed by the at least one processor, configured to store labeled data obtained by labeling, with the feedback on the alarm output by the alarm output section, a portion of the sensor data from each targeted sensor included in the targeted group, on which portion the feedback is made, wherein
    The machine learning section learns the analysis model by using the labeled data stored in the storage section.

5. The Examining apparatus according to claim 1, further comprising:
    an operational record acquiring section of the at least one processor, when executed by the at least one processor, configured to acquire an operational record of the at least one facility;
    an identification section of the at least one processor, when executed by the at least one processor, configured to identify, based on the operational record, a period in which the machine learning of the analysis model is not to be performed; and
    an exclusion processing section of the at least one processor, when executed by the at least one processor, configured to exclude, from targets for the machine learning, a piece of the sensor data from each targeted sensor included in the targeted group, which piece corresponds to the period in which the machine learning of the analysis model is not to be performed.

6. The examining apparatus according to claim 5, wherein the identification section of the at least one processor, when executed by the at least one processor, configured to identify, from the operational record, at least one of a maintenance period of the at least one facility, a stop period of the at least one facility, a startup period of the at least one facility and a test running period of the at least one facility as the period in which the machine learning of the analysis model is not to be performed.

7. The examining apparatus according to claim 1, wherein
the machine learning section of the at least one processor is further configured to learn a first analysis model among the plurality of types of analysis models by means of supervised machine learning using the sensor data from each targeted sensor included in the targeted group and an examination result that should be output as an examination result of the at least one facility, and
the machine learning section of the at least one processor is further configured to learn a second analysis model among the plurality of types of analysis models by the means of unsupervised machine learning using the sensor data from each targeted sensor included in the targeted group.

8. The examining apparatus according to claim 1, wherein the model selecting section of the at least one processor is further configured to select the analysis model used for examining the at least one facility from among the learned plurality of types of analysis models according to examination accuracy.

9. The examining apparatus according to claim 1, wherein
the group designation acquiring section of the at least one processor is further configured to acquire designation of a plurality of targeted groups,
the sensor data acquiring section of the at least one processor is further configured to acquire sensor data from each targeted sensor included in each of the plurality of targeted groups,
the machine learning section of the at least one processor is further configured to learn analysis models respectively associated with the plurality of targeted groups by using the sensor data from each targeted sensor included in each of the plurality of targeted groups, and
the examining section of the at least one processor is further configured to perform examination of the at least one facility by using each of the learned analysis models.

10. An examining apparatus comprising:
at least one processor;
a sensor data acquiring section of the at least one processor, when executed by the at least one processor, configured to acquire sensor data from each targeted sensor included in a plurality of targeted sensors to be analyzed among a plurality of sensors installed in at least one facility;
a machine learning section of the at least one processor, when executed by the at least one processor, configured to learn an analysis model by using the sensor data from each targeted sensor;
an examining section of the at least one processor, when executed by the at least one processor, configured to examine the at least one facility by using the learned analysis model; and a user interface section of the at least one processor, when executed by the at least one processor, configured to input feedback on an examination result obtained by using the analysis model, wherein
the machine learning section of the at least one processor, when executed by the at least one processor, is further configured to learn the analysis model by further using the feedback,
the machine learning section of the at least one processor is further configured to learn a plurality of types of analysis models by using the sensor data from each targeted sensor included in the targeted group,
the examining apparatus further comprises a model selecting section of the at least one processor, when executed by the at least one processor, configured to select at least one analysis model used for examining the at least one facility from among the learned plurality of types of analysis models,
the machine learning section of the at least one processor is further configured to learn a third analysis model among the plurality of types of analysis models by using the sensor data from all the targeted sensors included in the targeted group,
the machine learning section of the at least one processor is further configured to learn a fourth analysis model among the plurality of types of analysis models by using the sensor data from each targeted sensor, except for some targeted sensors which remain operational during the machine learning of the fourth analysis model, included in the targeted group,
the model selecting section of the at least one processor generates an evaluation result for the third analysis model and an evaluation result for the fourth analysis model using a formulated generalization coefficient for the third analysis model and for the fourth analysis model,
when the generalization coefficient for the third analysis model is higher than the generalization coefficient for the fourth analysis model, the model selecting section of the at least one processor selects the third analysis model over the fourth analysis model, and
when the generalization coefficient for the fourth analysis model is higher than the generalization coefficient for the third analysis model, the model selecting section of the at least one processor selects the fourth analysis model over the third analysis model.

11. A non-transitory recording medium having recorded thereon a program that causes a computer to function as an examining apparatus comprising:
a group designation acquiring section of the computer, when executed by the computer, to acquire designation of a targeted group including a plurality of targeted sensors to be analyzed among a plurality of sensors installed in at least one facility;
a sensor data acquiring section of the computer, when executed by the computer, to acquire sensor data from each targeted sensor included in the targeted group;
a machine learning section of the computer, when executed by the computer, to learn an analysis model by using the sensor data from each targeted sensor included in the targeted group; and
an examining section of the computer, when executed by the computer, to examine the at least one facility by using the learned analysis model, wherein the machine learning section of the computer learns a plurality of types of analysis models by using the sensor data from each targeted sensor included in the targeted group, the examining apparatus further comprises a model selecting section of the computer, when executed by the computer, to select at least one analysis model used for examining the at least one facility from among the learned plurality of types of analysis models, the machine learning section of the computer learns a third analysis model among the plurality of types of analysis models by using the sensor data from all the targeted sensors included in the targeted group, the machine learning section of the computer learns a fourth analysis model among the plurality of types of analysis models by using the sensor data from each targeted sensor, except for some targeted sensors which remain operational during the machine learning of the fourth analysis model, included in the targeted group, the model selecting section of the at least one processor generates an evaluation result for the third analysis model and an evaluation result for the fourth analysis model using a formulated generalization coefficient for the third analysis model and for the fourth analysis model, when the generalization coefficient for the third analysis model is higher than the generalization coefficient for the fourth analysis model, the model selecting section of the at least one processor selects the third analysis model over the fourth analysis model, and when the generalization coefficient for the fourth analysis model is higher than the generalization coefficient for the third analysis model, the model selecting section of the at least one processor selects the fourth analysis model over the third analysis model.

12. A facility monitoring method comprising:

acquiring designation of a targeted group including a plurality of targeted sensors to be analyzed among a plurality of sensors installed in at least one facility;

acquiring sensor data from each targeted sensor included in the targeted group;

machine learning at least four types of analysis models by using the sensor data from each targeted sensor included in the targeted group; and examining the at least one facility by using the learned analysis model, wherein the machine learning comprises learning a plurality of types of analysis models by using the sensor data from each targeted sensor included in the targeted group, the examining comprises selecting at least one analysis model used for the monitoring of the at least one facility from among the learned plurality of types of analysis models, the machine learning further comprises,
    learning a third analysis model among the plurality of types of analysis models by using the sensor data from all the targeted sensors included in the targeted group, and
    learning a fourth analysis model among the plurality of types of analysis models by using the sensor data from each targeted sensor, except for some targeted sensors which remain operational during the machine learning of the fourth analysis model, included in the targeted group, the examining further comprises,
    generating an evaluation result for the third analysis model and an evaluation result for the fourth analysis model using a formulated generalization coefficient for the third analysis model and for the fourth analysis model,
    selecting the third analysis model over the fourth analysis model when the generalization coefficient for the third analysis model is higher than the generalization coefficient for the fourth analysis model, and
    selecting the fourth analysis model over the third analysis model when the generalization coefficient for the fourth analysis model is higher than the generalization coefficient for the third analysis model.

* * * * *